(12) United States Patent
Hund et al.

(10) Patent No.: US 9,629,114 B2
(45) Date of Patent: *Apr. 18, 2017

(54) METHOD AND APPARATUS FOR WIRELESS TRANSMISSION OF DATA PACKETS

(71) Applicant: Siemens Aktiengesellschaft, Munich (DE)

(72) Inventors: Johannes Hund, Munich (DE); Andreas Heinrich, Munich (DE); Stephan Huckenholz, Munich (DE); Christian Schwingen-Schloegl, Putzbrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 196 days.

This patent is subject to a terminal disclaimer.

(21) Appl. No.: 14/341,983

(22) Filed: Jul. 28, 2014

(65) Prior Publication Data

US 2015/0003424 A1     Jan. 1, 2015

Related U.S. Application Data

(63) Continuation of application No. 13/582,715, filed on Sep. 19, 2012, now Pat. No. 9,191,877.

(51) Int. Cl.
*H04B 1/7163* (2011.01)
*H04B 10/524* (2013.01)
(Continued)

(52) U.S. Cl.
CPC ....... *H04W 56/0085* (2013.01); *H04J 3/0605* (2013.01)

(58) Field of Classification Search
CPC .. H04B 10/525; H04B 14/023; H04B 1/7163; H04B 1/717; H04B 1/7172; H04B 1/7176
See application file for complete search history.

(56) References Cited

U.S. PATENT DOCUMENTS 7,599,333 B2    10/2009   Jones et al. .................. 370/334
8,102,952 B2    1/2012    Sung et al. ................... 375/343
(Continued)

FOREIGN PATENT DOCUMENTS

CN      101141237 A     3/2008   .............. H04B 1/69
CN      101371451 A     2/2009
(Continued)

OTHER PUBLICATIONS

Chinese Office Action, Application No. 201410291476.5, 11 pages, Sep. 22, 2015.
(Continued)

*Primary Examiner* — Christopher Crutchfield
(74) *Attorney, Agent, or Firm* — Slayden Grubert Beard PLLC (57) ABSTRACT

Method for wire-free transmission of data packets between network nodes in a control network, wherein the data packets each have a preamble for synchronization, which preamble consists of a predetermined number of preamble symbols; wherein, in a first operating mode (FIG. 5a), each preamble-subsymbol (Cj, Cj+1) of a preamble symbol in the preamble is coded by the phase angle of a transmitted single signal pulse; wherein, in a second operating mode (FIG. 5b), in order to increase the signal recognition performance, for the preamble which is transmitted in the data packet, a signal pulse sequence (SIF) for coding the preamble-subsymbol (Cj, Cj+1) is transmitted instead of a single signal pulse, in which signal pulse sequence (SIF) the single signal pulse is transmitted repeatedly.

30 Claims, 8 Drawing Sheets

(51) Int. Cl.
*H04B 14/02* (2006.01)
*H04B 1/7183* (2011.01)
*H04W 56/00* (2009.01)
*H04J 3/06* (2006.01)

(56) References Cited

U.S. PATENT DOCUMENTS

| 8,155,243 | B2 | 4/2012 | Miscopein et al. | 375/340 |
| 2002/0097780 | A1 | 7/2002 | Odenwalder et al. | 375/146 |
| 2013/0136119 | A1 | 5/2013 | Hund et al. | 370/350 |

FOREIGN PATENT DOCUMENTS

| EP | 1892841 | A | 2/2008 | |
| EP | 1928119 | A1 | 6/2008 | |
| JP | 2004527143 | A | 9/2004 | H04J 11/00 |
| JP | 2006516369 | A | 6/2006 | H04B 1/69 |
| JP | 2007336054 | A | 12/2007 | H04B 1/04 |
| JP | 20080092535 | A | 1/2008 | G06F 3/153 |
| JP | 2008092535 | A | 4/2008 | |
| JP | 2008099252 | A | 4/2008 | |
| JP | 2008530912 | A | 8/2008 | H04L 12/28 |
| JP | 2009080741 | A | 4/2009 | G05G 19/05 |
| WO | 2008/082273 | A1 | 7/2008 | H04L 27/26 |
| WO | 2011/107471 | A1 | 9/2011 | |

OTHER PUBLICATIONS

Chinese Office Action, Application No. 201180011786.1, 11 pages, Nov. 14, 2014.
Chinese Office Action, Application No. 201180011786.1, 13 pages, Jan. 6, 2014.
International Search Report and Written Opinion, Application No. PCT/EP2011/053020, 15 pages, Jul. 5, 2011.
Korean Notice of Allowance, Application No. 10-2012-7025607, 3 pages, Sep. 26, 2014.
IEEE Standard 802.15.4aTM-2007, IEEE Standard for Information Technology—Telecommunications and Information Exchange between Systems—Local and Metropolitan Area Networks—Specific Requirements, Part 15.4: Wireless Medium Access Control (MAC) and Physical Layer (PHY) Specifications for Low-Rate Wireless Personal Area Networks (WPANs) Amendment 1: Add Alternate PHYs, 203 pages, Aug. 31, 2007.
Nardis, Luca De et al., "Overview of the IEEE 802.15.4/4a Standards for Low Data Rate Wireless Personal Data Networks," 4th Workshop on Positioning, Navigation, and Communication, 5 pages, © 2007.
Olonbayar, S. et al., "Sychronization Performance of Wireless Sensor Networks," Proceedings of the 2008 IEEE International Conference on Ultra-Wideband, vol. 2, 4 pages, Sep. 2008.
Hund, Johannes et al., "Evaluation and Optimization of Robustness in the IEEE 802.15.4a Standard," Proceedings of 2010 IEEE International Conference on Ultra-Wideband, 4 pages, Sep. 2010.
Wang, Yiyin et al., "TOA Estimation Using UWB with Low Sampling Rate and Clock Drift Calibration," ICUWB, Ultra-Wideband, IEEE, 6 pages, Sep. 9, 2009.
Lee, Jian Xing et al., "UWB Piconet Interference Suppression Using Clustered Ternary Orthogonal Signaling Scheme," ICUWB, Ultra-Wideband, IEEE, 5 pages, Sep. 9, 2009.
Jung, Sung-Yoon et al., "Design of Preamble Signal for Synchronization with UWB Non-coherent Energy Detection Receiver," Ultra-Wideband, IEEE, 5 pages, Sep. 2005.

METHOD AND APPARATUS FOR WIRELESS TRANSMISSION OF DATA PACKETS

CROSS-REFERENCE TO RELATED APPLICATIONS

This is a U.S. national stage of application No. PCT/EP2011/053020 filed 1 Mar. 2011. Priority is claimed on German Application No. 10 2010 009 678.4 filed 1 Mar. 2010, the content of which is incorporated herein by reference in its entirety.

BACKGROUND OF THE INVENTION

1. Field of the Invention

The invention relates to data packet transmission and, more particularly, to a method and apparatus for Wireless transmission of data packets between network nodes in a control network.

2. Description of the Related Art

During wireless communication between network nodes in a control network, for example, for controlling machines, data packets are transmitted via radio interfaces. Wireless communication for controlling machines requires, on the one hand, very low latencies and, on the other, very high data transmission reliability. It is also necessary for the control network to be able to co-exist with other wireless networks, particularly if the control network serves as a higher-level control network. In this case, the provision of high data transmission reliability represents a technical challenge because the majority of conventional measures used to increase reliability during data transmission increase latency. Industrial production plants with machines controlled by a control network constitute a difficult environment for wireless communication via radio interfaces. Production plants or industrial production cells with machines are associated with metal surfaces that interrupt or reflect the data transmission signals so that a relatively high level of electromagnetic noise is present. The reflecting metal surfaces result in multipath signal propagation.

The above-named problems mean conventional radio network technologies, such as Bluetooth or Institute of Electrical and Electronic Engineers (IEEE) standard 802.15.4 are not really suitable for control networks, i.e. in industrial production environments or factory automation.

Therefore, data transmission according to IEEE standard 802.15.4a was proposed in which data packets are transmitted in a wireless manner between network nodes of a control network. However, it has been found that data packet transmission according to IEEE standard 802.15.4 results in a high data packet loss rate. Here, the high packet loss rates are above all due to incorrectly recognized preambles in the headers of the data packets. This occurs in particular in receivers of network nodes, which work by energy detection.

SUMMARY OF THE INVENTION

It is therefore an object of the present invention to provide a method and apparatus for wireless transmission of data packets between network nodes in a control network with which, even in an industrial environment, data packets can be transmitted reliably between network nodes in a control network with a low data packet loss rate.

This and other objects and advantages are achieved in accordance with the invention by a method for wireless transmission of data packets between network nodes in a control network, where the data packets each have a preamble for synchronization consisting of a predetermined number of preamble symbols,
where during a first operating mode each preamble subsymbol of a preamble symbol in the preamble is coded by the phase angle of a transmitted single signal pulse,
where during a second operating mode, in order to increase the signal recognition performance for the preamble transmitted in the data packet, a signal pulse sequence for coding the preamble subsymbol is transmitted instead of a single signal pulse, where the single signal pulse within the signal pulse sequence is transmitted repeatedly.

Hence, the method in accordance with the invention introduces an additional operating mode that simplifies recognition of the preamble and hence significantly reduces data packet loss rate.

In one embodiment of the method in accordance with the invention, during the first operating mode, the single signal pulse is followed by a signal pause, which is provided to avoid intersymbol interference (ISI) between the preamble subsymbols.

In another embodiment of the method in accordance with the invention, during the second operating mode, the signal pulse sequence is also followed by a signal pause, which is provided to avoid the intersymbol interference (ISI) between the preamble subsymbols.

In a further embodiment of the method in accordance with the invention, each preamble symbol of the preamble is ternary coded by a predetermined number of preamble subsymbols.

In a still further embodiment of the method in accordance with the invention, during the first operating mode, the single signal pulse is preceded by a positive, negative or neutral sign.

In one further embodiment of the method in accordance with the invention, during the second operating mode, the signal pulses of the signal pulse sequence are also each preceded by a positive, negative or neutral sign.

In yet a further contemplated embodiment of the method in accordance with the invention, during the first operating mode, each preamble subsymbol includes a single signal pulse having a predetermined pulse duration, where the single signal pulse is followed by a signal pause, the duration of which is longer than the pulse duration of the single signal pulse by a first spreading factor.

In one further embodiment of the method in accordance with the invention, during the second operating mode, each preamble subsymbol includes signal pulse sequence consisting of a predetermined number of consecutive single signal pulses with the same phase angle, where each single signal pulse of the signal pulse sequence has a predetermined pulse duration.

In another further embodiment of the method in accordance with the invention, the signal pulse sequence is followed by a signal pause, the duration of which is longer than the duration of the signal pulse sequence by a second spreading factor.

In a further alternative embodiment of the method in accordance with the invention, the signal pulse sequence is followed by a signal pause, the duration of which corresponds to the duration of a preamble subsymbol in the first operating mode minus the duration of the signal pulse sequence.

In one embodiment of the method according to the invention, in the first operating mode, each preamble subsymbol of a preamble symbol in the preamble is coded in conformity with IEEE standard 802.15.4a by the phase angle of a transmitted single signal pulse.

In yet a further embodiment of the method in accordance with the invention, the single signal pulse transmitted in the first operating mode and the signal pulses of the signal pulse sequence transmitted in the second operating mode have a pulse shape with a phase angle which is clearly derived from the polarity of a spectral pulse response.

In a further embodiment of the method in accordance with the invention, the pulse shape is a Gaussian pulse shape.

In one further embodiment of the method in accordance with the invention, the pulse shape is a Gaussian doublet pulse shape.

In another embodiment of the method in accordance with the invention, the pulse shape is a root raised pulse cosine pulse shape.

In one further embodiment of the method in accordance with the invention, the preamble of the data packet has a synchronization header with $2^{n1}$ preamble symbols and a start frame delimiter (SFD) with $2^{n2}$ preamble symbols, where $n^1$, $n^2$ are natural numbers.

In another embodiment of the method in accordance with the invention, the received synchronization header of the preamble is used to calculate a first correlation value by a SYNC correlation device in dependence on which a receiving amplifier of the network node within a control network is set.

In another embodiment of the method in accordance with the invention, the received start frame delimiter (SFD) in the preamble is used to calculate a second correlation value by an SFD correlation device for the detection of the start of useful data within the received data packet.

In one further embodiment of the method in accordance with the invention, the pulse duration of the single signal pulse is about 2 nsec.

In another embodiment of the method in accordance with the invention, during the second operating mode, the number N of the consecutive single signal pulses of the signal pulse sequence is N=4.

It is also an object of the invention to provide a wireless control network with network nodes including network nodes that transmit data packets, where the data packets each have a preamble for synchronization consisting of a predetermined number of preamble symbols, where, during a first operating mode, each preamble subsymbol of a preamble symbol in the preamble is coded by the phase angle of a transmitted single signal pulse, and where, during a second operating mode, in order to increase the signal recognition performance for the preamble transmitted in the data packet, a signal pulse sequence for coding the preamble subsymbol is transmitted instead of a single signal pulse, the single signal pulse within the single pulse sequence being transmitted repeatedly.

In a further embodiment of the wireless control network in accordance with the invention, during the first operating mode, the wireless control network forms an IEEE 802.15.4a network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further embodiments of the method according to the invention and of the wireless control network according to the invention are explained in more detail below with reference to the attached figures, in which.

DESCRIPTION OF THE PREFERRED EMBODIMENTS

Figure 1:
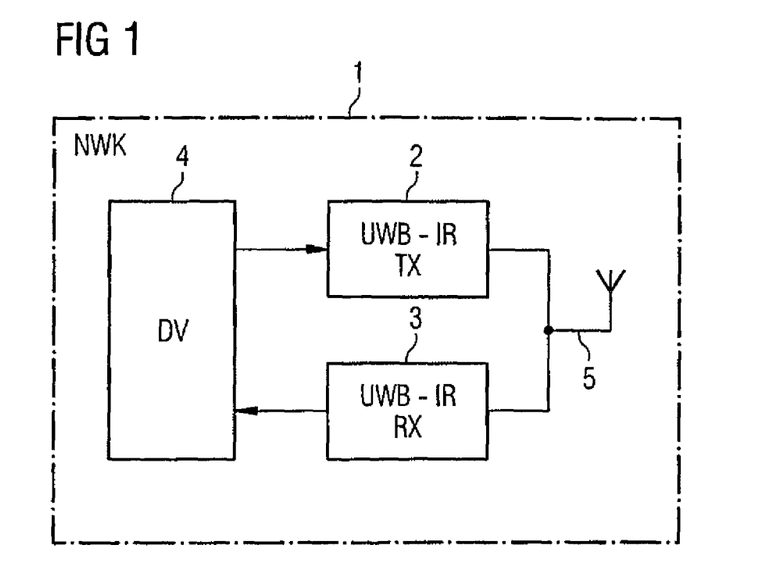
FIG. 1 is a schematic block diagram of an exemplary embodiment of a network node used in the wireless control network in accordance with the invention.

With the wireless control network in accordance with the invention, data packets DP are transmitted between network nodes 1. As shown in FIG. 1, in the exemplary embodiment depicted, a network node 1 of the control network comprises a transmitting device 2 and a receiving device 3 which are each connected to a data processing device 4, such as a CPU or microprocessor. The transmitting device 2 and the receiving device 3 are also connected to a transmitting and receiving antenna 5. The network nodes 1 use the transmitting and receiving antenna 5 to communicate via a wireless interface or radio interface with further network nodes in the wireless control network.

In one contemplated embodiment, the transmitting device 2 and the receiving device 3 each have separate antennas, i.e., the transmitting device 2 is connected to a transmitting antenna and the receiving device 3 is connected to a receiving antenna. The network node 1 can comprise further devices or switching parts, i.e., actuators, sensors and its own power supply. The network node 1 uses the radio interface to exchange data packets DP with other network nodes for communication. These data packets DP each have a preamble PRE for synchronization, where the preamble consist of a predetermined number of preamble symbols S.

During a first operating mode, each preamble subsymbol C of a preamble symbol S in the preamble PRE is coded by the phase angle of a transmitted single signal pulse. During a second operating mode, a signal pulse sequence for coding the respective preamble subsymbol C is transmitted instead of a single signal pulse SIF to increase the signal recognition performance for the preamble PRE which is transmitted in the data packet DP, wherein the single signal pulse used in the first operating mode is transmitted repeatedly to form the signal pulse sequence SIF.

During the second operating mode, the signal recognition performance for the preamble PRE transmitted in the data packet DP is increased relative to the first operating mode so that it is easier for the receiving device 3 of the network node 1 to recognize the preamble PRE of the received data packet DP. This significantly reduces the data packet loss rate DPVR. In one embodiment, as shown in FIG. 1, the network node 1 can be switched between the two operating modes. Alternatively, the network node 1 can be preconfigured for a specific operating mode, i.e., the second operating mode.

During both the first and the second operating modes, the single signal pulse or the signal pulse sequence SIF is in each case followed by a signal pause SP provided to avoid intersymbol interference ISI between the preamble subsymbols C. Here, each preamble symbol S is preferably ternary coded by a predetermined number of preamble subsymbols C. With ternary coding, the single signal pulse or the signal pulses of the signal pulse sequence SIF are each preceded by a positive, negative or neutral sign. During the first operating mode, the preamble subsymbol C has a single signal pulse with a predetermined pulse duration. This pulse duration is, for example, 2 nsec. Here, in the first operating mode, the single signal pulse is followed by a signal pause SP, the duration of which is, in one embodiment, longer than the pulse duration of the single signal pulse by a first spreading factor LI.

While, during a first operating mode, each preamble subsymbol C of a preamble symbol S in the preamble PRE is coded by the phase angle of a transmitted single signal pulse, during the second operating mode, in order to increase the signal recognition performance for the preamble PRE transmitted in the data packet DP, a signal pulse sequence SIF for coding the respective preamble subsymbol C is transmitted instead of a single signal pulse. Here, in the second operating mode, each preamble subsymbol C has a signal pulse sequence SIF consisting of a predetermined number N of consecutive single signal pulses with the same phase angle. Each single signal pulse of the signal pulse sequence SIF has a predetermined pulse duration. The signal pulse sequence is followed by a signal pause SP. In one embodiment, this signal pause SP has a duration that is longer than the duration of the signal pulse sequence SIF by a second spreading factor L2.

In one alternative embodiment, the signal pause SP has a duration corresponding to the duration of a preamble subsymbol C in the first operating mode minus the duration of the signal pulse sequence SIF. The presently contemplated embodiment has the advantage that, overall, the preamble subsymbol length remains the same in both operating modes so that, compared to the first embodiment, shorter latencies are obtained. In contrast, the embodiment in which the duration of the signal pause is longer than the duration of the signal pulse sequence by a second spreading factor L2 has higher resistance to multipath signal propagation of the signals.

In one embodiment, during the first operating mode of the network node shown in FIG. 1, each preamble subsymbol C of a preamble symbol S in the preamble PRE is coded in conformity with IEEE standard 802.15.4a by the phase angle of a transmitted single signal pulse. Hence, the network node 1 shown in FIG. 1 conforms to a standard and is expanded by the second operating mode. The signal pulse sequence SIF transmitted during the second operating mode consists of signal impulses with, in one embodiment, a pulse shape corresponding to the pulse shape of the pulse transmitted in the first operating mode or single signal pulse. Here, the signal pulses of the signal pulse sequence SIF each have a pulse shape, the phase angle of which is clearly derived from the polarity of a spectral pulse response.

In one embodiment, the pulse shape is a Gaussian pulse shape. Alternatively, the pulse shape can also be a Gaussian doublet pulse shape or a root raised pulse cosine pulse shape. The data packets DP exchanged by the network node 1 shown in FIG. 1 each have a preamble PRE for synchronization. Here, the preamble of the data packet DP preferably has a synchronization header SYNC with $2^{n1}$ preamble symbols and a start frame delimiter SFD with $2^{n2}$ preamble symbols, where $n^2$ are natural numbers.

In one embodiment of the network node 1 in accordance with the invention, the receiving device 3 contains correlation devices.

In another embodiment, the received synchronization header SYNC of the preamble PRE of the data packet DP is used to calculate a first correlation value by means of a SYNC-correlation device within the receiving device 3 of the network node 1 in dependence on which a receiving amplifier of the network node 1 is set.

In a further embodiment, the receiving device 3 of the network node 1 has a further SFD correlation device. The start frame delimiter SFD of the preamble PRE is used to calculate a second correlation value for the detection of the start of useful data within the received data packet DP by this SFD correlation device of the receiving device 3.

Figure 2:
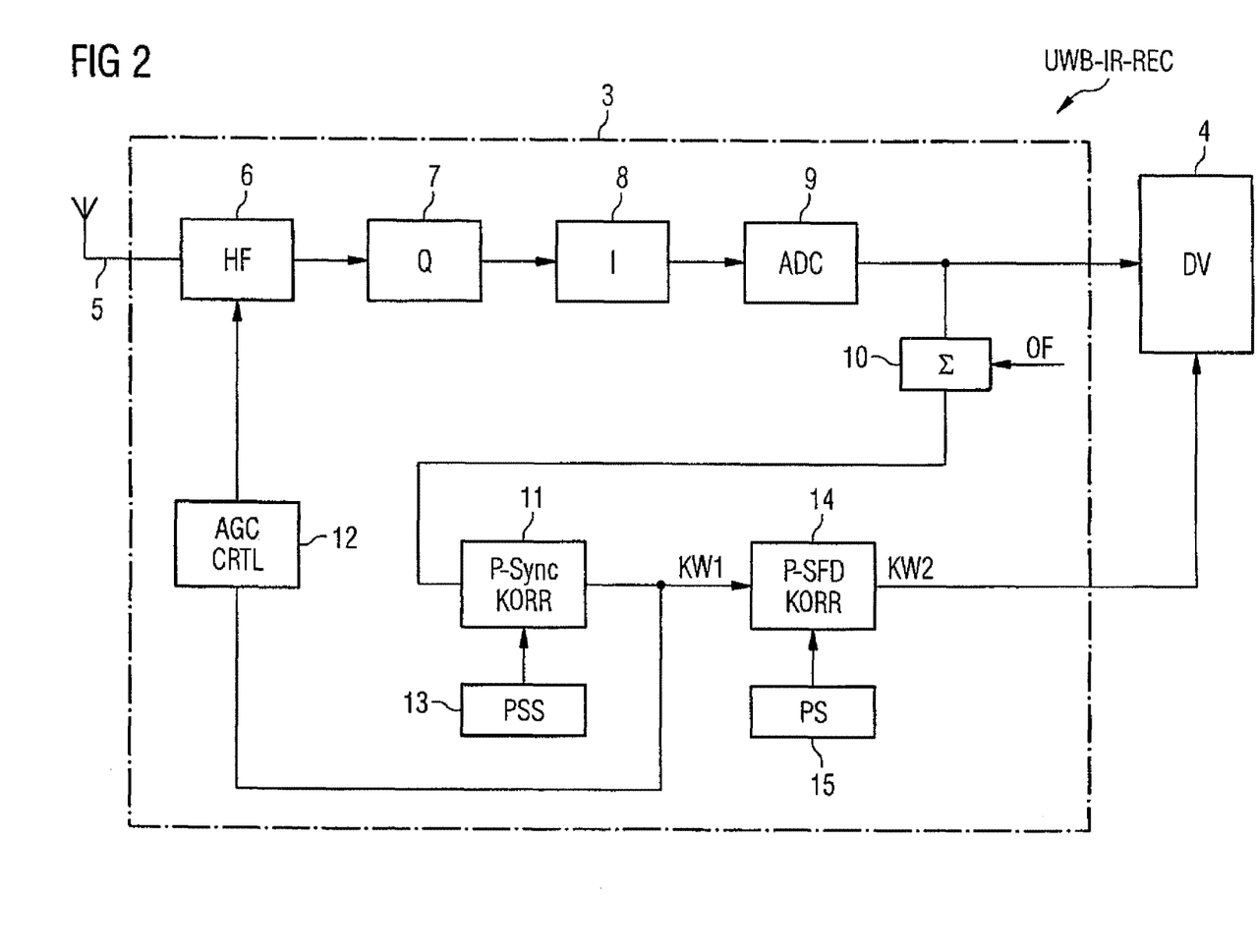
FIG. 2 is a schematic block diagram of an exemplary embodiment for a receiver used in the network node shown in FIG. 1.

The receiving device 3 within the network node 1 shown in FIG. 1 can be an ultra-wideband (UWB) impulse response (IR) receiver which, in one possible embodiment, is configured as shown in FIG. 2. With reference to FIG. 2, the receiving device 3 or the receiver 3 has an HF stage 6 for downmixing the signals received via the antenna 5. The HF stage 6 can contain one or more signal amplifiers and a bandpass filter BPF and generates a baseband signal that is applied to a signal squaring stage 7. The downmixed, bandpass-filtered signal is squared and applied to a signal integrator 8. The signal integrator 8 integrates the signal with the symbol time Ts and applies the integrated value to an analog-to-digital converter ADC 9. The digital value formed is supplied to a data processing device, for example, the data processing device 4 shown in FIG. 1. In addition, as shown in FIG. 2, the receiving device 3 comprises a summing or aggregation device 10, which adds up the digitized values for a preamble subsymbol C. In one possible embodiment, this summing device 10 is controlled or adjusted by an oversampling factor OF, where the oversampling factor OF is obtained from the ratio between the duration of the preamble subsymbol $T_c$ and the duration of a symbol $T_s$.

The summing device 10 is connected on the output side to a first correlation device 11 of the receiving device 3. The data packet DP received by the receiving device 3 contains a preamble PRE, which can comprise a synchronization header SYNC and a start frame delimiter SFD. The preamble synchronization header-correlation device 11 shown in FIG. 2 uses the received synchronization header SYNC of the preamble PRE to calculate a first correlation value KW1, which is output to an automatic gain control 12. In dependence on the first correlation value KW1, the automatic gain control 12 controls the gain of at least one receiving amplifier contained in the HF stage 6 for tuning the receiving device 3 to the received signals. In the embodiment shown in FIG. 2, the correlation device 11 is connected to a register 13 containing preamble subsymbols C or preamble chips C, for example, 31 preamble subsymbols. The preamble subsymbols C stored in the register form a stored recognition template. The correlation value emitted by the correlation device 11 indicates how similar a received preamble PRE is to an expected preamble. In one embodiment, a threshold value comparator can be used to compare the correlation value with a threshold value TH. As soon as the calculated correlation value exceeds the threshold value, it is recognized that the received preamble PRE corresponds to the expected preamble. Hence, when the threshold value TH is exceeded, the preamble symbol is recognized.

In the embodiment shown in FIG. 2, an SFD correlation device 14 uses the received start frame delimiter SFD of the received data packet DP to calculate a second correlation value KW2 for the selection of the start of useful data within the data packet DP. The SFD correlator 14 is connected to a register 15 containing, for example, eight prespecified preamble symbols S for the expected start frame delimiter SFD. If the start frame delimiter SFD is recognized, the data processing device 4 is activated to process the useful data emitted by the ADC 9, as shown in FIG. 2.

Figure 3:
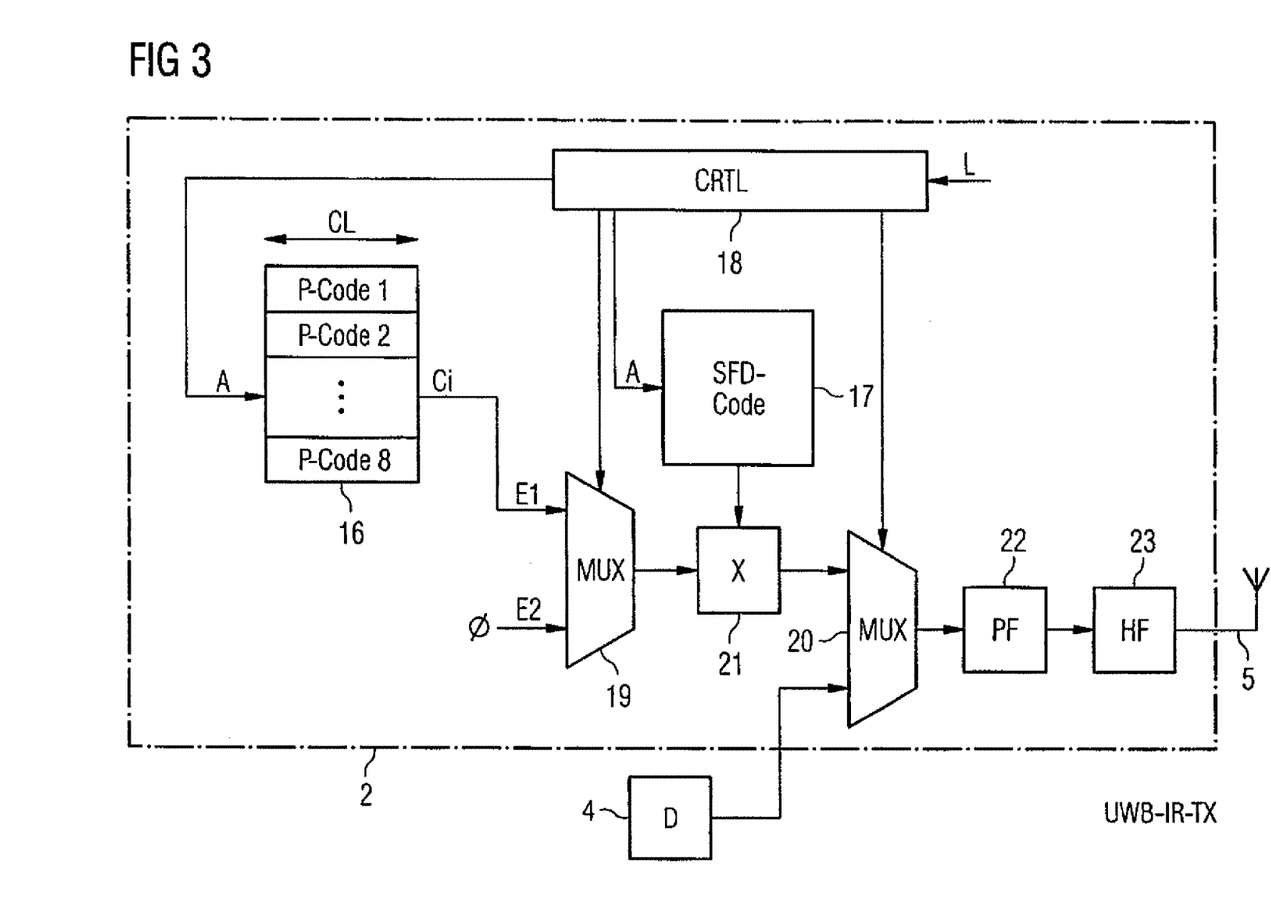
FIG. 3 is a schematic block diagram of an exemplary embodiment of the transmitter contained in the network node of FIG. 1.

FIG. 3 is a schematic block diagram depicting an exemplary embodiment of the transmitting device 2, which is used in the network node 1 shown in FIG. 1. In the exemplary embodiment shown in FIG. 3, the transmitting device 2 is an ultra wideband (UWB)–impulse response (IR) transmitter. The switching part shown in FIG. 3 generates the preamble PRE of a data packet DP, which is used in the method in accordance with the invention. A data memory 16, for example, a RAM memory, contains, for example, eight preamble codes P-Code 1 to P-Code 8 each comprising a predetermined number of preamble subsymbols C, for example, 31 preamble subsymbols C. The number of preamble subsymbols C within a preamble code forms the code length CL, as shown in FIG. 3. A second data memory 17 contains the preamble symbols of a standard SFD (start frame delimiter) code. The two data memories 16, 17, which are, for example, RAM memories, are addressed by a control logic 18. The control logic 18 also controls, via control lines, two multiplexers 19, 20, as shown in FIG. 3. The control logic 18 can contain a plurality of counting devices or counters.

In one embodiment, one counter of the control logic 18 counts from a value zero up to a spreading factor LI, where, at a count value zero, the first input E1 of the multiplexer 19 is switched through and, at the other count values of this counter, the second input E2 of the multiplexer 19 is switched through. Thus, a number of zeros or zero values are attached to the preamble subsymbol $C_i$ of the preamble code currently being addressed in the memory 16, where the number of attached zero values, which form a signal pause SP, corresponds to spreading factor L−1. In one possible embodiment of the control logic 18, the spreading factor L is adjustable. If, for example, the spreading factor L is 16, fifteen zero values are attached to each preamble subsymbol C read from the memory 16 before the next preamble subsymbol C is switched through. The sequence of preamble subsymbols C formed in the multiplexer 19, each of which have a number of zero values corresponding to the spreading factor L is, as shown in FIG. 3, supplied to a mixer or multiplier 21. This multiplies a preamble symbol of the standard SFD code read from the memory 17 with the sequence emitted by the multiplexer 19. As soon as a preamble PRE is ready, the control logic 18 switches the multiplexer 20 to the data input, which is connected to a data processing device, for example, the data processing device 4 shown in FIG. 1. On the output side, the multiplexer 20 is connected to a pulse shaper 22, which is in turn connected on the output side to an HF stage 23.

In one embodiment, the control logic 18 includes an integrated clock generator for clocking the counter. In one embodiment, the clock generator generates a clock signal CLK with an audio frequency of 500 MHz, where this clock signal is applied to the counter for controlling the multiplexer 19. Alternatively, the clock signal CLK of the control logic 18 can also be supplied from outside.

Figure 4:
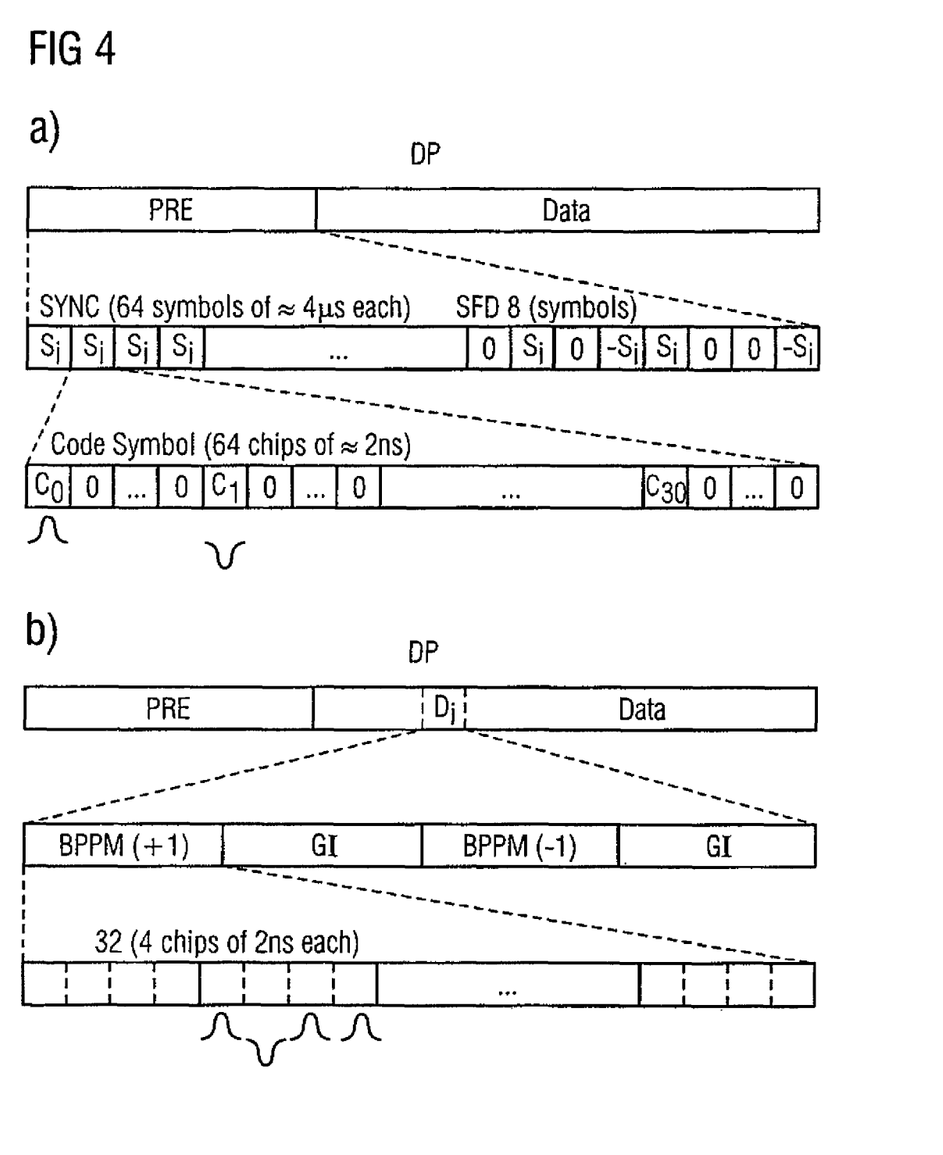
FIG. 4A, 4B are timing diagrams explaining the data structure of a data packet transmitted with the method in accordance with the invention.

FIG. 4A is a timing diagram illustrating the data structure of the preamble PRE of a data packet DP used with the method and apparatus in accordance with the invention. The preamble PRE consists of a synchronization header SYNC with a start frame delimiter SFD. The synchronization header SYNC preferably consists of $2^{n1}$ preamble symbols S. In the exemplary embodiment shown in FIG. 4A, the synchronization header SYNC has, for example, 64 preamble symbols S (n1=6). The preamble PRE also contains a start frame delimiter SFD with $2^{n2}$ preamble symbols, for example eight preamble symbols, such as shown in FIG. 4A (n2=3). Each preamble symbol S in turn consists of preamble subsymbols C or code chips $C_i$. During the first operating mode of the method in accordance with the invention, each preamble subsymbol C of a preamble symbol S in the preamble PRE is coded by the phase angle of a transmitted single signal pulse. Consequently, each code chip $C_i$ has a single signal pulse, which is followed by a sequence of zero values forming a signal pause SP. The signal pause SP serves to prevent intersymbol interference ISI between the preamble subsymbols or code chips $C_i$. A signal pulse is preferably preceded by a positive, negative or neutral sign. The preamble symbol S is preferably ternary coded by a predetermined number of preamble subsymbols C. Preferably, each preamble subsymbol is ternary coded by 31 preamble symbols, as shown in FIG. 4A. During the first operating mode, a single signal pulse with a certain prespecified pulse duration of, for example, 2 nsec is provided at the start of each preamble subsymbol or code chip $C_i$. The single signal pulse is followed by a number of zero values, where the number of zero values is determined by the spreading factor L minus 1. Hence, with a spreading factor of L=16, a single signal pulse will be followed by 15 zero values and, with a spreading factor of 64, a single signal pulse will be followed by 63 zero values. The higher the number of the zero values, and hence the longer the following signal pause SP, the more resistant the preamble PRE is to interference from multipath signal propagation. However, due to the greater length of the preamble subsymbols, the latency increases. During the first operating mode of the method in accordance with the invention, each preamble subsymbol or code chip $C_i$ is coded by the phase angle of a transmitted single signal pulse, where the single signal pulse has a specific pulse shape and a predetermined pulse duration. A single signal pulse can be a pulse with a Gaussian pulse shape, a Gaussian doublet pulse shape or a root raised pulse cosine pulse shape. The pulse duration of the single signal pulse is, for example, under 2 nsec. As a result, the single signal pulse has only a low amount of energy during transmission, which is difficult for the receiving device to recognize, particularly in the case of a noisy environment.

Figure 5:
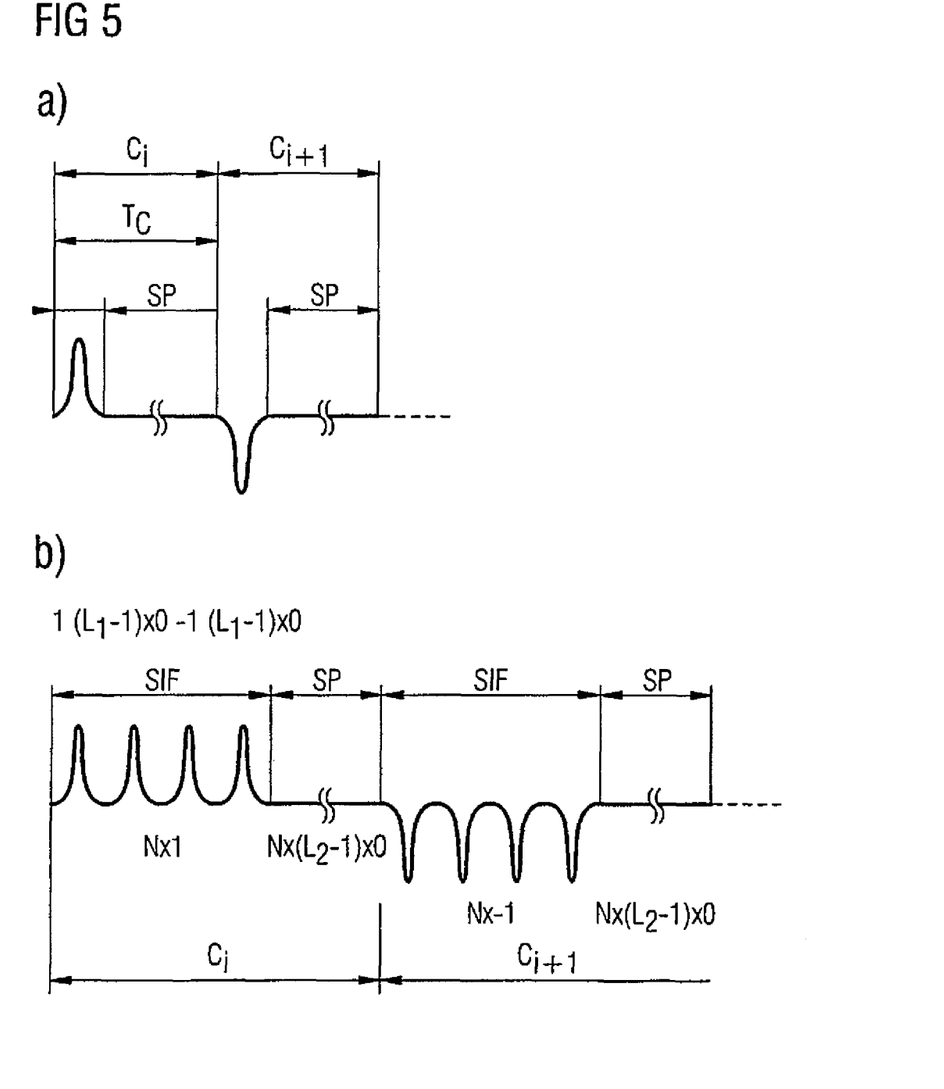
FIG. 5A, 5B are signal diagrams explaining the modes of operation provided with the method in accordance with the invention.

FIG. 5A is a signal diagram illustrating the signal transmission during the first operating mode of the method in accordance with the invention. During this operating mode, a single signal pulse is initially transmitted, which is followed by a specific number of zero values. The number of zero values is determined by the spreading factor L. For example, with a spreading factor of L=16, fifteen zero values will be transmitted. With a pulse duration of 2 nsec, the duration $T_c$ of the preamble subsymbol C is 16×2 nsec=32 nsec. With a spreading factor of 64, the duration of the preamble subsymbol Tc is, for example, 128 nsec. If, for example, the code length CL or the number of preamble subsymbols C within a preamble symbol S CL=31, then the duration of a symbol within the preamble PRE is about 4 μsec. In the example shown in FIG. 5A, a single signal pulse preceded by a positive sign is initially transmitted, followed by a single signal pulse preceded by a negative sign.

In one embodiment of the method in accordance with the invention, each preamble subsymbol C is ternary coded, where each single signal pulse is preceded by a positive, negative or even neutral sign VZ. Other types of coding, such as binary coding, are also possible.

FIG. 5B is a signal diagram for explaining the second operating mode of the method in accordance with the invention. During the second operating mode, a signal pulse sequence SIF for coding the preamble symbol S is transmitted instead of a single signal pulse to increase the signal recognition performance for the preamble PRE transmitted in the data packet DP. Here, the single signal pulse transmitted in the first operating mode is transmitted repeatedly. During the second operating mode, each preamble subsymbol C has a predetermined number N of consecutive single signal pulses with the same phase angle. In the example shown in FIG. 5B, the signal pulse sequence SIF has four consecutive single signal pulses (N=4). The signal pulse sequence SIF consisting of four pulses is followed by a signal pause SP. In one embodiment, the duration of the signal pause SP is longer than the duration of the signal pulse sequence by a second spreading factor L2. The spreading factor L2 can be identical to the spreading factor L1 used in the first operating mode. If the second spreading factor L2 is, for example, 16 as in the exemplary embodiment shown in FIG. 5b, the signal pulse sequence SIF will be followed by a signal pause SP with 4×15=60 zero values. This is then followed by the next signal pulse sequence SIF of the next code chip $C_i$ or preamble subsymbol, as in the example shown in FIG. 5B, in which the signal pulse sequence SIF consists of four consecutive signal impulses preceded by negative signs.

In an alternative exemplary embodiment, the duration of the signal pause SP can correspond to the duration of a preamble subsymbol $C_i$ or code chip in the first operating mode minus the duration of the signal pulse sequence SIF. This embodiment has the advantage that the duration of the code chip $C_i$ or the preamble subsymbol is equally long in both operating modes. Insofar, the latency is better due to the shorter preamble subsymbol length compared to the other alternative. However, in the embodiment shown in FIG. 5B the resistance to interference due to multipath signal propagation is higher due to the length of the signal pause SP and the associated lower intersymbol interference ISI between the preamble subsymbols C.

Hence, during the second operating mode shown in FIG. 5B, it is not single signal pulses that are transmitted in the preamble PRE but signal pulse sequences SIF. These signal pulse sequences SIF are followed by a longer signal pause SP which, in the exemplary embodiment shown in FIG. 5B, is extended according to the number of pulses in the signal pulse sequence SIF. In the exemplary embodiment shown in FIG. 5B, the average energy emitted does not change and the energy balance remains unchanged.

In the method in accordance with the invention, during the second operating mode, the preamble symbol S in the preamble PRE is extended in the embodiment shown in FIG. 5B, where the recognition performance is improved or increased in that repetitions of data packets DP can be avoided. Preferably, the modification of the preamble symbol S is neutral with respect to time and energy where, however, advantageously the data packet loss rate DPVR is immensely reduced.

In the method in accordance with the invention, the pulse shape is preferably selected such that its phase angle is clearly derived from the polarity of the spectral pulse response. For example, the pulse shape selected is a Gaussian pulse shape, a Gaussian doublet pulse shape or a root raised pulse cosine pulse shape.

In one embodiment, in the receiving device 3, the sign VZ preceding the received symbol is determined before the squaring, where the preceding sign VZ determined is used for the preamble recognition. In this presently contemplated embodiment, an even better or even higher recognition performance for the recognition of the preamble symbol S is provided. In the present embodiment, to this end, in the receiving device 3 in FIG. 2, a preceding sign recognition circuit is provided after the HF stage 6, which determines the sign VZ preceding the single pulse and then inserts the preceding sign determined again behind the ADC 9 as a bit or preceding sign bit.

FIG. 4B shows the data part of the data packet DP used in the method in accordance with the invention. The data part can be modulated with burst position modulation (BPM). During this period, very short, high-energy pulse sequences followed by long pauses can be transmitted. The transmitted information is coded by the position of the pulse burst within the period for a symbol, i.e., for the front or rear half of the symbol. During this, only the front quarter of the half is used in all cases, i.e., the quarter 1 and quarter 3 of each symbol period. The second quarter of each half of the symbol is provided as a safety distance or guard interval GI in order to reduce intersymbol interference. Consequently, the symbol interval has the data structure shown in FIG. 4B. The symbol interval consists of two halves with the length $T_{BPPM}$, in each of which the second half is kept free as a guard interval GI. The two remaining quarters are in turn again divided into several on-hopping positions with the length $t_{burst}$. For each data bit, a second bit containing the checksum of the systematic convolution decoder is coded into the phase angle of the individual pulse of the pulse burst.

Figure 6:
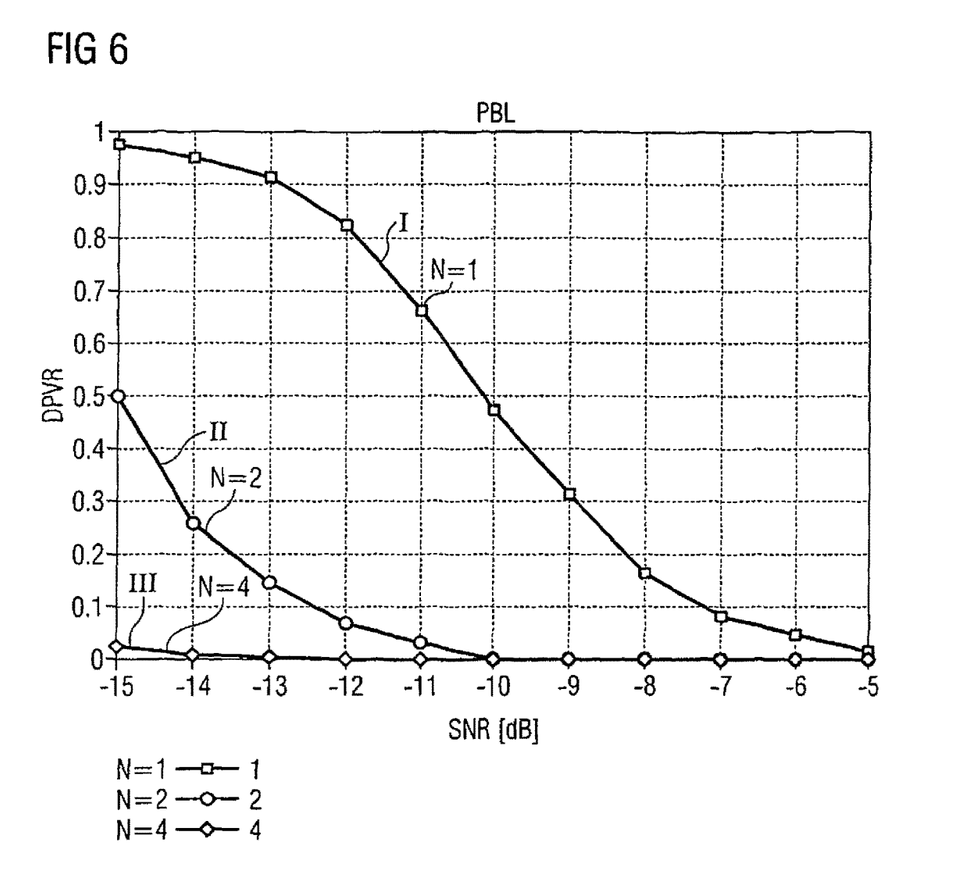
FIG. 6 is a graphical plot illustrating an improvement to the data loss rate achieved by the method in accordance with the invention.

FIG. 6 is a graphical plot illustrating the reduction in the data packet loss rate DPVR by the method in accordance with the invention for the transmission of data packets DP between network nodes 1 of a control network. An increasing signal-noise ratio SNR reduces the data packet loss rate DVPR as shown in FIG. 6. The data packet loss rate DVPR also drops with a rising preamble burst length PBL.

The curve I shows the data packet loss rate DPVR for a preamble subsymbol C, which is coded by the phase angle of an individually transmitted single signal pulse (N=1). Consequently, the curve 2 shows the behavior in the first operating mode of the method in accordance with the invention for wireless transmission of data packets DP between network nodes 1 of a control network.

The curve II shows the behavior of data packet loss rate DPVR in the second operating mode with a number N=2 of consecutive signal pulses of the signal pulse sequence SIF. If the number of signal pulses within the signal pulse sequence SIF during the second operating mode is N=4, the behavior is as indicated by the curve III in FIG. 6.

As shown in FIG. 6 the data packet loss rate DPVR can be reduced to almost zero, even with as few as four consecutive signal impulses (N=4), thus permitting almost 100% successful synchronization even with a signal-noise ratio SNR=−15 decibels.

Figure 7:
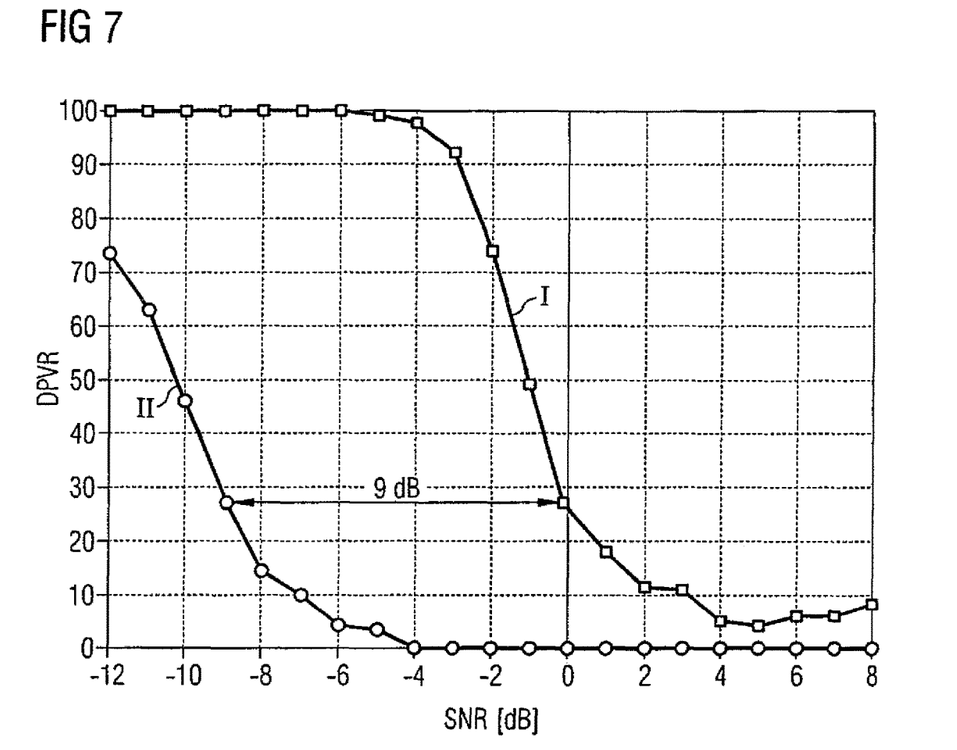
FIG. 7 a further signal diagram depicting a further reduced data packet loss rate with an embodiment with preceding sign recovery.
Figure 8:
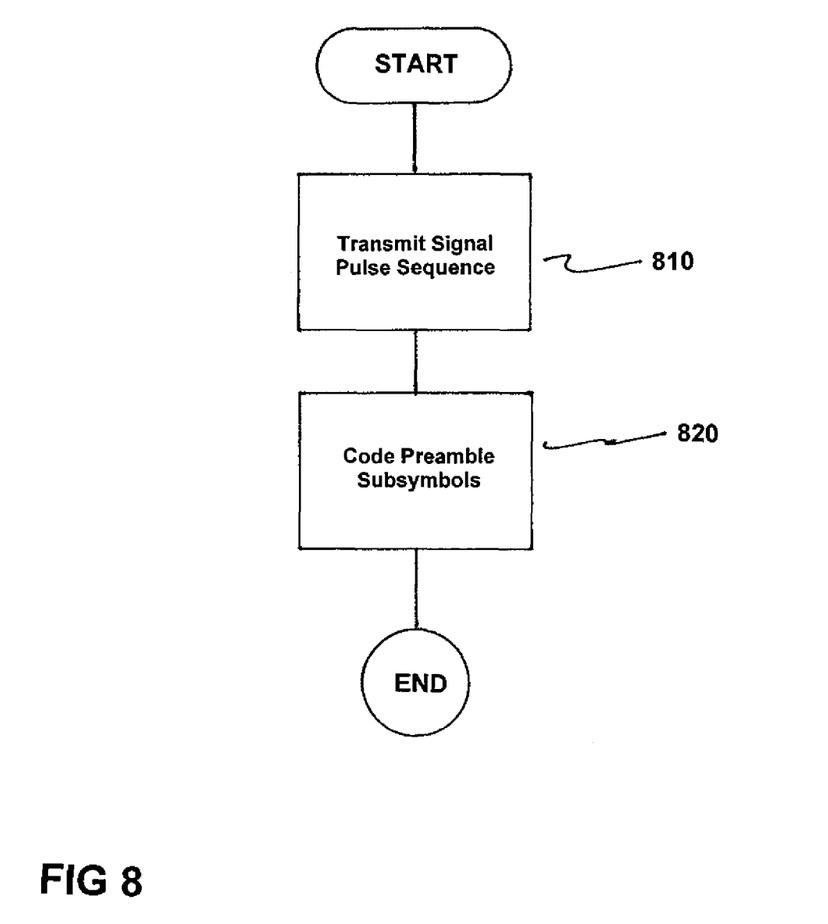
FIG. 8 is a flowchart of the method in accordance with the invention.

The additional performance of preceding sign recognition results in the depicted course of the data packet loss rate DPVR in dependence on the signal-noise ratio SNR shown in FIG. 7. As evident from FIG. 7, the preceding sign recognition of the preamble codes achieves the same data packet loss rate DPVR even with a 9-decibel worse signal-noise ratio SNR compared to a receiver without preceding sign recognition. In FIG. 7, curve I shows a case without preceding sign recognition and curve II shows the course in the case of a receiving device with preceding sign recognition.

While there have been shown and described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for wireless transmission of data packets of a network node in a control network, wherein each data packet includes a preamble for synchronization that includes a predetermined number of preamble symbols, the method comprising:
   in a first operating mode, coding each preamble subsymbol of a preamble symbol in the preamble of each transmitted data packet by the phase angle of a transmitted single signal pulse,
   in a second operating mode, coding the preamble subsymbol of a preamble symbol in the preamble of each transmitted packet by a signal pulse sequence in which the single signal pulse repeatedly, instead of using a single signal pulse, wherein the signal pulse sequence increases a signal recognition performance for the preambles of the transmitted data packets, and
   configuring the network node either the first operating mode or the second operating mode, or switching the network node between the first and second operating modes.

2. The method of claim 1, wherein each single signal pulse or signal pulse sequence is followed by a signal pause for avoiding intersymbol interference between preamble subsymbols.

3. The method of claim 1, wherein each preamble symbol is ternary coded by a predetermined number of preamble subsymbols, wherein each single signal pulse and signal pulse of a signal pulse sequence is preceded, in the sense of the mathematical leading sign function or signum function "sgn(x)" which assigns to the single signal pulse or the signal pulses of the signal pulse sequence its leading sign or their leading sign through the values "+1", "−1" and "0", in accordance with the specified series of values, by a positive, negative or neutral sign.

4. The method of claim 3, wherein the preceding signs of the signal pulses of a received data packet are detected to reduce the data packet loss rate.

5. The method of claim 1, wherein:
   in the first operating mode, each preamble subsymbol has a single signal pulse with a predetermined pulse duration, and
   the single signal pulse is followed by a signal pause having a duration that is longer than a pulse duration of the single signal pulse by a spreading factor.

6. The method of claim 1, wherein:
   in the second operating mode, each preamble subsymbol has a signal pulse sequence consisting of a predetermined number of consecutive single signal pulses with the same phase angle,
   each single signal pulse in each signal pulse sequence has a predetermined pulse duration, and
   each signal pulse sequence is followed by a signal pause having a duration that is longer than a duration of the signal pulse sequence by a spreading factor or corresponds to a duration of a preamble subsymbol in the first operating mode minus the duration of the signal pulse sequence.

7. The method of claim 1, wherein, in the first operating mode, each preamble subsymbol of a preamble symbol in the preamble of each transmitted data packet is coded in conformity with the standard IEEE 802.15.4a by the phase angle of a transmitted single signal pulse.

8. The method of claim 1, wherein the single signal pulse transmitted in the first operating mode and the signal pulses of the signal pulse sequence transmitted in the second operating mode have a pulse shape having a phase angle derived from the polarity of a spectral pulse response.

9. The method of claim 8, wherein the pulse shape is a Gaussian pulse shape, a Gaussian doublet pulse shape, or a root raised pulse cosine pulse shape.

10. The method of claim 1, wherein the preamble of each data packet has a synchronization header with $2^{n1}$ preamble symbols and a start frame delimiter with $2^{n2}$ preamble symbols, wherein n1 and n2 are natural numbers.

11. The method of claim 10, comprising:
   calculating a correlation value by a synchronization correlation device based on the synchronization header of the preamble of a data packet of the control network received by a network node, and
   setting a receiving amplifier within an RF stage of the network node based on the calculated correlation value.

12. The method of claim 10, comprising calculating a correlation value for the detection of the start of useful data within the data packet based on the start frame delimiter in the preamble of a data packet received by a network node of the control network.

13. The method of claim 1, wherein the pulse duration of each single signal pulse is 2 nsec.

14. The method of claim 1, wherein in the second operating mode, the number of consecutive single signal pulses of each signal pulse sequence is 4.

15. An apparatus for wireless transmission of data packets of a network node in a control network, the apparatus comprising:
   a controller programmed to control the transmission of data packets, each data packets including a preamble for synchronization that includes a predetermined number of preamble symbols, wherein in a first operating mode, the network node is configured to code each preamble subsymbol of a preamble symbol in the preamble of each transmitted data packet by the phase angle of a transmitted single signal pulse, wherein in a second operating mode, the network node is configured to code the preamble subsymbol of a preamble symbol in the preamble of each transmitted packet by a signal pulse sequence in which the single signal pulse repeatedly, instead of using a single signal pulse, wherein the signal pulse sequence increases a signal recognition performance for the preambles of the transmitted data packets, and wherein the controller is configured to (a) operate the network node in either one of the first operating mode and the second operating mode, or (b) switch the network node between the first and second operating modes.

16. The apparatus of claim 15, wherein the controller is programmed such that each single signal pulse or signal pulse sequence is followed by a signal pause for avoiding intersymbol interference between preamble subsymbols.

17. The apparatus of claim 15, wherein the controller is programmed such that each preamble symbol is ternary coded by a predetermined number of preamble subsymbols, wherein each single signal pulse and signal pulse of a signal pulse sequence is preceded, in the sense of the mathematical leading sign function or signum function "sgn(x)" which assigns to the single signal pulse or the signal pulses of the signal pulse sequence its leading sign or their leading sign through the values "+1", "−1" and "0", in accordance with the specified series of values, by a positive, negative or neutral sign.

18. The apparatus of claim 17, wherein the controller is programmed such that the preceding signs of the signal pulses of a received data packet are detected to reduce the data packet loss rate.

19. The apparatus of claim 15, wherein the controller is programmed such that in the first operating mode, each preamble subsymbol has a single signal pulse with a predetermined pulse duration, and the single signal pulse is followed by a signal pause having a duration that is longer than a pulse duration of the single signal pulse by a spreading factor.

20. The apparatus of claim 15, wherein the controller is programmed such that:

in the second operating mode, each preamble subsymbol has a signal pulse sequence consisting of a predetermined number of consecutive single signal pulses with the same phase angle, each single signal pulse in each signal pulse sequence has a predetermined pulse duration, and each signal pulse sequence is followed by a signal pause having a duration that is longer than a duration of the signal pulse sequence by a spreading factor or corresponds to a duration of a preamble subsymbol in the first operating mode minus the duration of the signal pulse sequence.

21. The apparatus of claim 15, wherein the controller is programmed such that in the first operating mode, each preamble subsymbol of a preamble symbol in the preamble of each transmitted data packet is coded in conformity with the standard IEEE 802.15.4a by the phase angle of a transmitted single signal pulse.

22. The apparatus of claim 15, wherein the controller is programmed such that the single signal pulse transmitted in the first operating mode and the signal pulses of the signal pulse sequence transmitted in the second operating mode have a pulse shape having a phase angle derived from the polarity of a spectral pulse response.

23. The apparatus of claim 22, wherein the pulse shape is a Gaussian pulse shape, a Gaussian doublet pulse shape, or a root raised pulse cosine pulse shape.

24. The apparatus of claim 15, wherein the preamble of each data packet has a synchronization header with $2^{n1}$ preamble symbols and a start frame delimiter with $2^{n2}$ preamble symbols, wherein n1 and n2 are natural numbers.

25. The apparatus of claim 24, wherein the controller is programmed to:

calculate a correlation value by a synchronization correlation device based on the synchronization header of the preamble of a data packet of the control network received by a network node, and set a receiving amplifier within an RF stage of the network node based on the calculated correlation value.

26. The apparatus of claim 24, wherein the controller is programmed to calculate a correlation value for the detection of the start of useful data within the data packet based on the start frame delimiter in the preamble of a data packet received by a network node of the control network.

27. The apparatus of claim 15, wherein the controller is programmed such that the pulse duration of each single signal pulse is 2 nsec.

28. The apparatus of claim 15, wherein the controller is programmed such that in the second operating mode, the number of consecutive single signal pulses of each signal pulse sequence is 4.

29. A network node for wireless transmission of data packets, each data packets including a preamble for synchronization that includes a predetermined number of preamble symbols, wherein in a first operating mode, the network node is configured to code each preamble subsymbol of a preamble symbol in the preamble of each transmitted data packet by the phase angle of a transmitted single signal pulse, wherein in a second operating mode, the network node is configured to code the preamble subsymbol of a preamble symbol in the preamble of each transmitted packet by a signal pulse sequence in which the single signal pulse repeatedly, instead of using a single signal pulse, wherein the signal pulse sequence increases a signal recognition performance for the preambles of the transmitted data packets, and wherein the network node is either (a) configured to operate in either one of the first operating mode and the second operating mode or (b) configured to switch the network node between the first and second operating modes.

30. A wireless control network comprising:

at least one network node configured to transmit data packets, each data packets including a preamble for synchronization that includes a predetermined number of preamble symbols, wherein for each network node:

in a first operating mode, the network node is configured to code each preamble subsymbol of a preamble symbol in the preamble of each transmitted data packet by the phase angle of a transmitted single signal pulse, and in a second operating mode, the network node is configured to code the preamble subsymbol of a preamble symbol in the preamble of each transmitted packet by a signal pulse sequence in which the single signal pulse repeatedly, instead of using a single signal pulse, wherein the signal pulse sequence increases a signal recognition performance for the preambles of the transmitted data packets, and wherein each network node is either (a) configured to operate in either one of the first operating mode and the second operating mode or (b) configured to switch the network node between the first and second operating modes.

* * * * *